Figure 1:
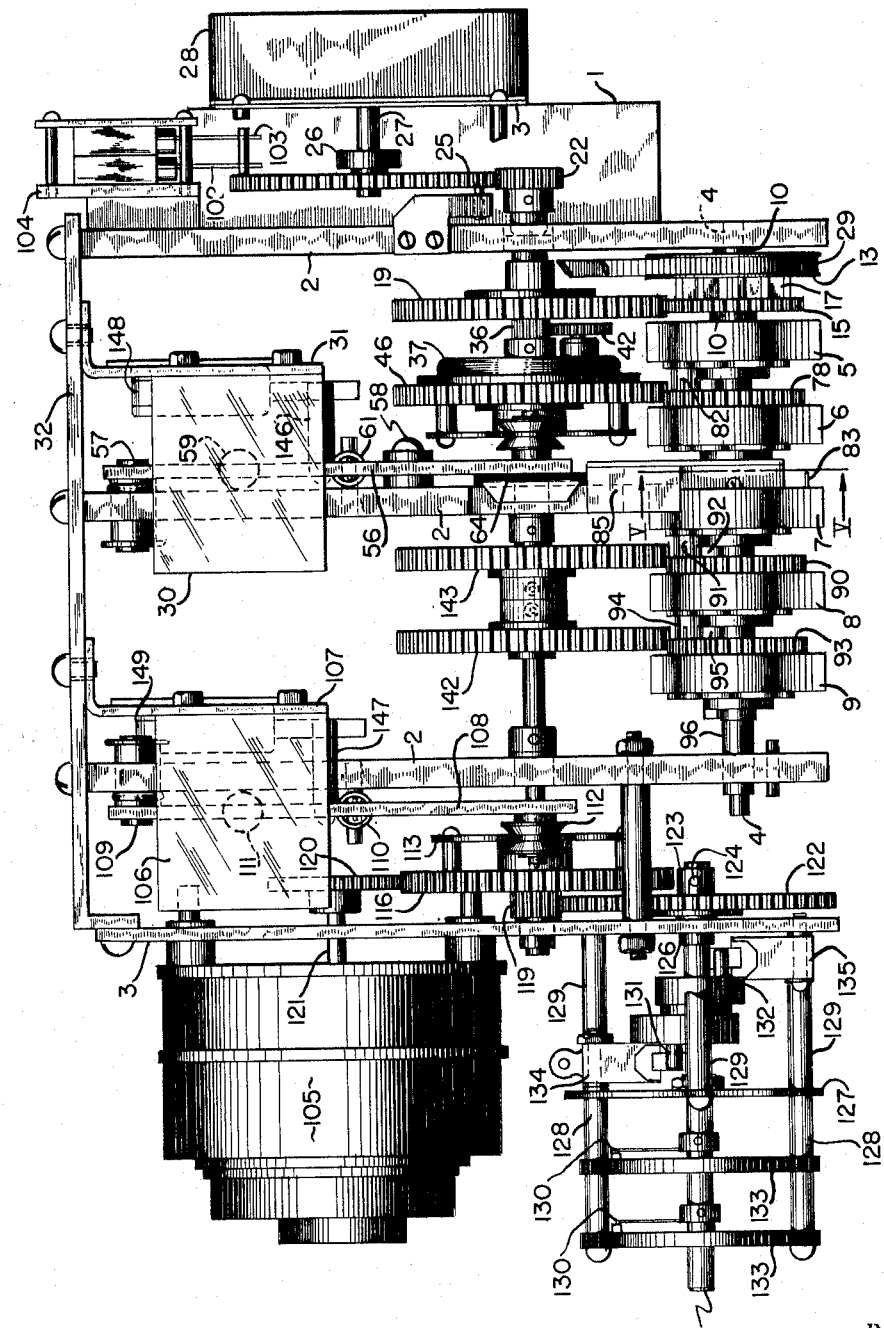

April 7, 1964 C. E. ADLER 3,128,041
COUNTER
Filed July 13, 1961 5 Sheets-Sheet 1

INVENTOR.
CLARENCE E. ADLER
BY Marshall & Wilson
ATTORNEYS

April 7, 1964
C. E. ADLER
3,128,041
COUNTER
Filed July 13, 1961
5 Sheets-Sheet 2
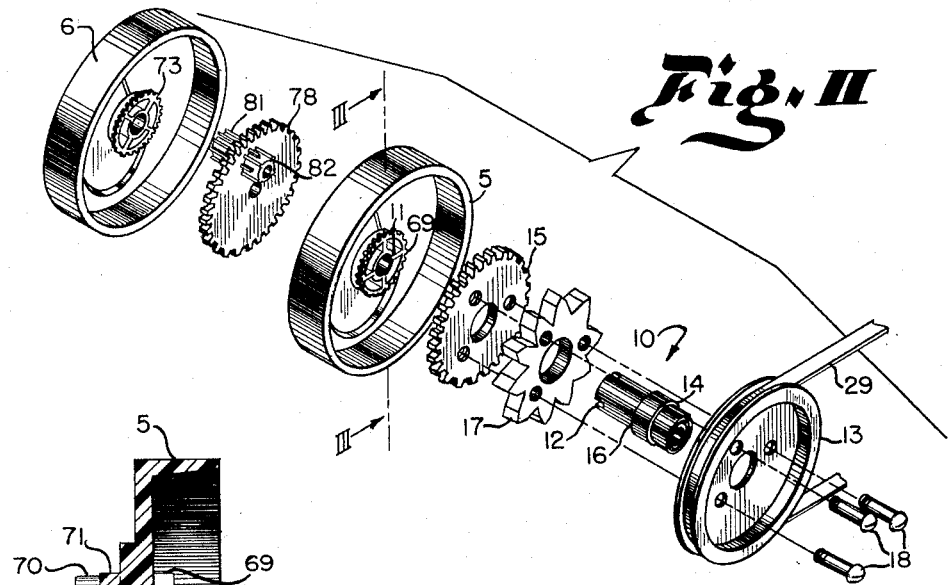
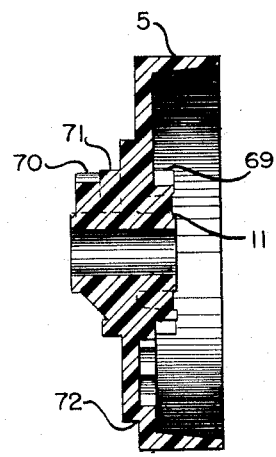
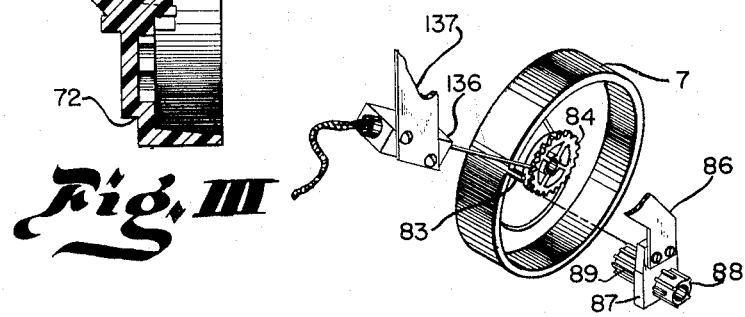
INVENTOR.
CLARENCE E. ADLER
BY *Marshall & Wilson*
ATTORNEYS

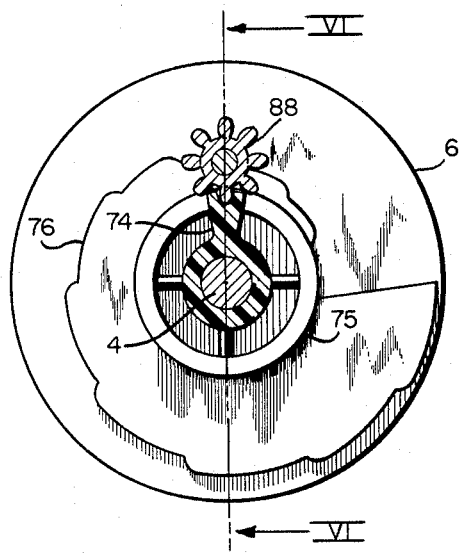
Fig. V
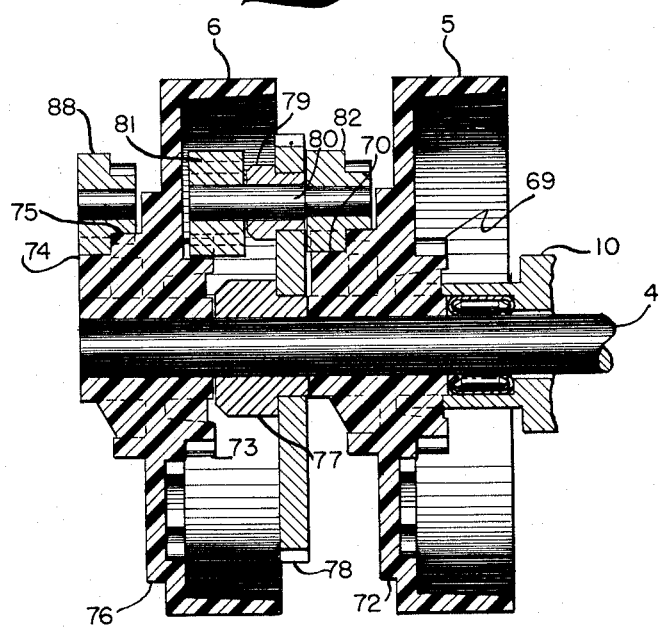
Fig. VI

April 7, 1964  C. E. ADLER  3,128,041
COUNTER
Filed July 13, 1961   5 Sheets-Sheet 4
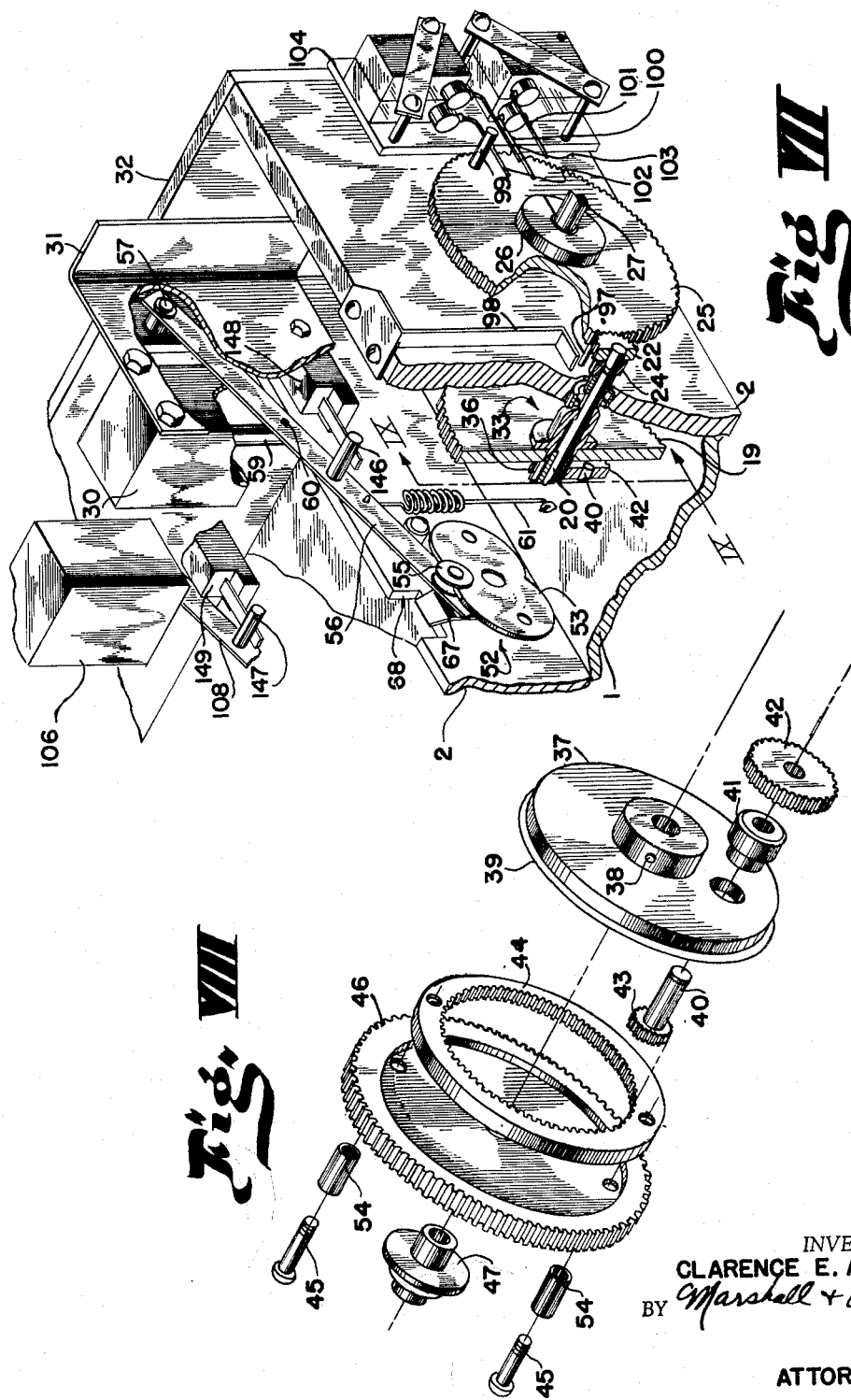
INVENTOR.
CLARENCE E. ADLER
BY Marshall + Wilson
ATTORNEYS April 7, 1964  C. E. ADLER  3,128,041
COUNTER
Filed July 13, 1961  5 Sheets-Sheet 5
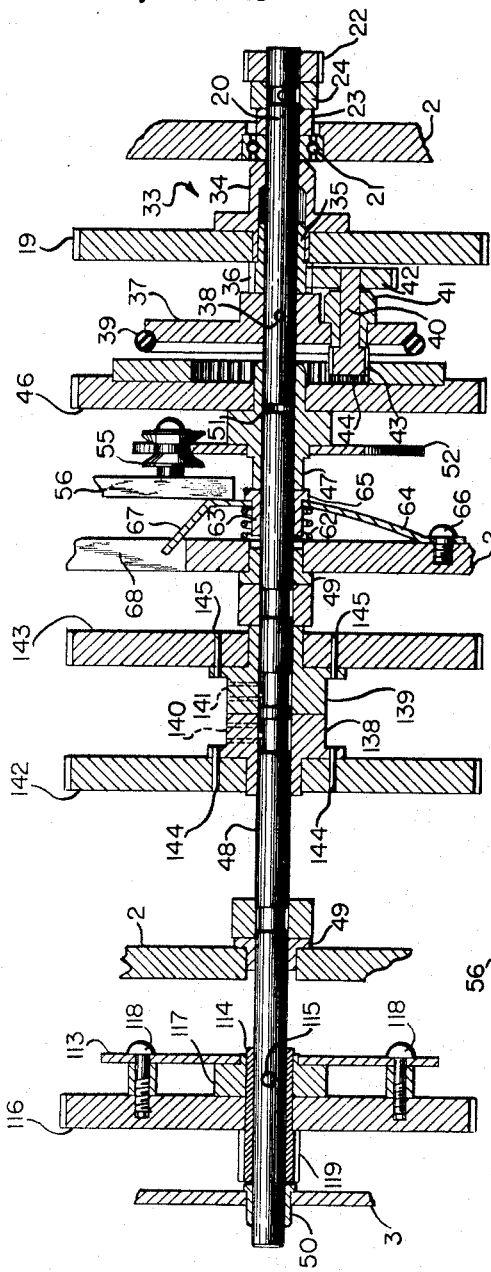
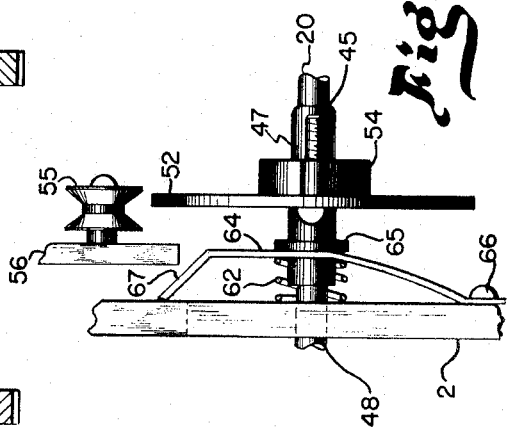
INVENTOR.
CLARENCE E. ADLER
BY Marshall + Wilson
ATTORNEYS United States Patent Office 3,128,041
Patented Apr. 7, 1964

3,128,041
COUNTER
Clarence E. Adler, Toledo, Ohio, assignor to Toledo Scale Corporation, Toledo, Ohio, a corporation of Ohio
Filed July 13, 1961, Ser. No. 123,683
19 Claims. (Cl. 235—91)

This invention relates to mechanical counting mechanisms.

Mechanical counting mechanisms usually employ intermittent motion transmitting means between the various indicia bearing members such that each of the indicia bearing members is stationary except when the indication of the next lower member is changing from 9 to 0 or 0 to 9. The rapid acceleration and deceleration of the intermittently moved indicia bearing members limits the speed at which the prior counting mechanisms may be operated.

It is often desirable to count the movements of a device or the number of operations which said device performs and it is often desirable, in instruments of the servo type for measuring variables, to have digital indications of the measurements. Variables which are measured by such instruments are weight, pressure, temperature, height, position, etc. An example of such an instrument is disclosed in U.S. application Serial No. 806,394, filed April 14, 1959, in the name of Robert J. Maring, showing a weighing scale of the electrical or electronic type wherein a transducer, such as a strain gage load cell or a linear differential transformer or a potentiometer, produces an output voltage which is a function of load applied to the weighing scale and a continuously automatically adjustable voltage source supplies a second voltage in opposition to the output voltage and is operated by servo means in response to differences between the voltages. The servo means also operates, through connection means including a belt, an indicator hand juxtaposed to an ordinary stationary, indicia-bearing chart. The mechanical counting mechanism of the invention is especially suitable for use as a substitute for such indicator hand and chart. When so substituted, the mechanical counting mechanism gives digital weight indications of loads upon the weighing scale.

Mechanical counting mechanisms, because of their relative reliability, ruggedness and long life expectancy, are highly desirable for the above purposes. However, for most high speed counting applications mechanical counters have been ruled out because their structural components are unable to withstand the above rapid acceleration and deceleration of the intermittently moved indicia bearing members, i.e., shock transfer. The above instruments of the servo type for measuring variables, such as the electrical or electronic weighing scale disclosed in the U.S. application Serial No. 806,394, operate at very high speeds. Heretofore, mechanical counters have not been suitable for producing digital indications of the measurements made by such instruments.

Electronic counters have become common for applications involving high speed counting. Such electronic counters have a large capacity and an almost unlimited rate of storage which may be quickly and accurately read or which may be recorded or remembered by the counter. However, electronic counters tend to be rather bulky and expensive because of the number of tubes and components required. Furthermore, although electronic equipment has become much more reliable than it used to be, it is still much more subject to failure than relatively simpler mechanical equipment, and the repair of electronic equipment often requires a great deal of time and effort on the part of a skilled man.

Accordingly, the objects of this invention are to improve mechanical counters, to increase the operating speeds of such counters, to eliminate transfers involving great shocks in such counters, and to provide means for adding second inputs to be counted into such counters.

One embodiment of this invention enabling the realization of these objects is a mechanical counter having a plurality of number wheels each with ascending integral numbers from one through zero thereon and having two speeds of operation. High speed operation is used from the beginning of a counting cycle to about the end of the cycle. Low speed operation is used at the end of the cycle. During high speed operation, the number wheel of the lowest order and the number wheel of the next higher order rotate as one. During low speed operation, ordinary intermittent motion transmitting means between the various number wheels operate such that each of the number wheels, except the wheel of the lowest order, is stationary except when the indication of the next lower number is changing from 9 to 0 or 0 to 9. Means also are provided whereby second inputs to be counted can be added into the counter during high or low speed operation.

In accordance with the above, one feature of this invention resides in turning the number wheel of the lowest order and the number wheel of the next higher order together as one during high speed operation. This greatly increases the speed of operation and eliminates shock transfer between such number wheels.

Another feature resides in the provision of the means for adding second inputs to be counted into the counter during high or low speed operation.

The counter is suitable, for example, for use in counting the movements of a device or the number of operations which such device performs and for use in producing digital indications of the measurements made by instruments of the servo type for measuring variables. When used in the electrical or electronic weighing scale system disclosed in the foregoing U.S. application Serial No. 806,394 to obtain digital weight indications, the counter is driven by the above servo means. After loads are placed upon or removed from the scale, the counter is operated at high speed until arrival of condition at near balance. During this time, the number wheels of the two lowest orders turn as one. Normal transfer occurs between the rest of the number wheels. Accordingly, during most of the cycle, the counter operates at high speed with no shock transfer between the number wheels of the two lowest orders where, in the prior mechanical counters, rapid acceleration and deceleration of the intermittently moved number wheels limited the speed at which the prior counters could be operated. At arrival of condition at near balance, the counter automatically is shifted to low speed operation. Normal transfer then occurs between all of the number wheels until the scale system comes to balance, whereupon the weight of the load upon the scale is displayed on the number wheels.

Electrical or electronic weighing scale systems of the type disclosed in the above U.S. application Serial No. 806,394 often are provided with auxiliary load mechanism, called "unit weight" mechanism, for adding to the normal capacity of the scale. Such a weighing scale system provided with such unit weight mechanism is disclosed in U.S. Patent No. 2,944,808 issued July 12, 1960 to C. F. Spademan. When used in such a weighing scale system having unit weight mechanism, the counter has a second input which adds the unit weight indication to the count, whereby the total weight of the load upon the scale is displayed in one set of figures. For example, if the normal capacity of the scale is 1000 pounds and nine 1000 pound unit weights are added in weighing a 10,000 pounds load, 10,000 will be displayed by the counter's number wheels. The means for adding second inputs to be counted into the counter, a feature of the invention, is operated manually or automatically and may be operated at any time during operation of the counter.

The above and other objects and features of this invention will be appreciated more fully from the following detailed description when read with reference to the accompanying drawings wherein:

FIG. I is a plan view of mechanical counting mechanism according to this invention;

FIG. II is an exploded, isometric view of the number wheel of the lowest order and adjacent elements of the counting mechanism;

FIG. III is an enlarged, sectional view taken along the line III—III of FIG. II;

FIG. IV is an isometric view of a number wheel of an order higher than the number wheel illustrated in FIG. II;

FIG. V is an enlarged, sectional view taken along the line V—V of FIG. I;

FIG. VI is a sectional view taken along the line VI—VI of FIG. V;

FIG. VII is an enlarged, fragmentary isometric view of the right hand part of the counting mechanism as viewed in FIG. I;

FIG. VIII is an enlarged, exploded isometric view of a portion of the mechanism shown near the right hand part of FIG. IX;

FIG. IX is a sectional view taken along the line IX—IX of FIG. VII; and

FIG. X is an elevational view of a portion of the mechanism shown near the middle of FIG. IX illustrating such mechanism in a second operating position.

Referring to the drawings, a mechanical counter as contemplated in this invention includes a base plate 1 from which is erected three relatively heavy plates 2, the middle one of which is shorter than are the other two as viewed in FIG. I, and a pair of end plates 3. A stationary shaft 4 extends between and is carried by two of the plates 2. Five number wheels, a units wheel 5, a tens wheel 6, a hundreds wheel 7, a thousands wheel 8 and a ten thousands wheel 9, are rotatably mounted on the stationary shaft 4. The number wheel 5 of the lowest order is located near the right hand end of the shaft 4 as viewed in FIG. I, the number wheel 6 of the next higher order is located next to the number wheel 5, etc. Each of the number wheels bears ascending integral numbers from one through zero (not shown) which may be observed through a window in a cover (not shown). Counterparts of the number wheels and their cover are found in ordinary mechanical counters.

The units wheel 5 is attached to the end of a hub 10 mounted for rotation on the stationary shaft 4, webs 11 of the units wheel 5 being received in longitudinal end slots 12 in the hub 10 in pressed fits (FIG. II). This rotatably mounts the units wheel 5 on the stationary shaft 4. An input pulley 13 is carried on the end of the hub 10 remote from the units wheel 5 and is located against a shoulder 14 on the hub, a gear 15 is carried on the hub 10 against a shoulder 16 on the hub, and a ten-pointed star wheel 17 is sandwiched in between the input pulley 13 and the gear 15, screws 18 holding the gear 15, star wheel 17 and input pulley 13 together. Accordingly, the hub 10, the units wheel 5, the gear 15, the star wheel 17 and the input pulley 13 are rotatable about the axis of the stationary shaft 4 as one.

The gear 15 meshes with a gear 19 mounted for rotation on a shaft 20 rotatably mounted at its right hand end as viewed in FIG. IX in bearings 21 mounted in one of the plates 2. The gear 19 drives the shaft 20, but only indirectly. The gear 19 turns once for every two turns of the gear 15 meshed therewith. Secured to the right hand end of the shaft 20 as viewed in FIGS. I, VII and IX is a pinion 22, a spacer 23 separating a hub 24 attached to the pinion 22 from the bearings 21. The pinion 22 meshes with a gear 25 secured to a hub 26 which is secured in turn to a shaft 27 of a potentiometer 28 carried by one of the end plates 3.

The counter is used as a substitute for the indicator hand and chart shown in the foregoing U.S. application Serial No. 806,394 and gives digital weight indications of loads upon the electrical or electronic weighing scale disclosed therein. Such weighing scale includes transducer means that produces an output voltage which is a function of load applied to the weighing scale and a potentiometer, like the potentiometer 28 (FIG. I), that supplies a second voltage in opposition to the output voltage and is operated by a servo motor in response to differences between the voltages. The servo motor is connected to the input pulley 13 by a belt 29 and drives both the potentiometer shaft 27 and all of the number wheels 5, 6, 7, 8 and 9. The counter is calibrated, like the indicator hand and chart shown in the foregoing U.S. application Serial No. 806,394, to indicate the output voltage of the above transducer means in terms of weight. For example, if the weighing scale has a capacity of 1000 pounds and a load weighing 1000 pounds is placed upon the scale, the servo motor drives the input pulley 13 until the potentiometer shaft 27 turns the sliding contact of the potentiometer 28 from its beginning to its end position. At the same time, the number wheels turn until 1000 is indicated by the number wheels 5, 6, 7 and 8.

The counter, like the indicator in the above U.S. application Serial No. 806,394, has two speeds of operation. After loads are placed upon or removed from the scale, the counter is operated at high speed until arrival of condition at near balance. During this time, the units wheel 5 and the tens wheel 6 turn as one as hereinafter described in detail. Normal mutilated gear transfer occurs between the rest of the number wheels. Accordingly, during most of the cycle, the tens wheel turns ten times faster than is normal in an ordinary mechanical counter with no shock transfer between the number wheels of the two lowest orders where, in prior mechanical counters, rapid acceleration and deceleration of the intermittently moved number wheels limited the speed at which the prior counters could be operated. At arrival of condition at near balance, the counter automatically is shifted into low speed operation. The means for changing the counter from one speed to the other includes a solenoid 30 attached to a bracket 31 carried by a plate 32 secured to all of the plates 2 and to the left hand one of the end plates 3 as viewed in FIG. I. The solenoid 30 is controlled and operated by the same circuitry that operates the speed changing solenoid disclosed in the above U.S. application Serial No. 806,394. Briefly, the coil of the solenoid is energized when the normally open contacts, in circuit with the coil, of a sensitive null detecting relay are closed. The relay contacts are closed after loads are placed upon or removed from the scale until arrival of condition at near balance of the scale to energize the solenoid. Energization of the solenoid 30 shifts the counter into high speed as hereinafter described in detail. The relay contacts are opened at arrival of condition at near balance to deenergize the solenoid. Deenergization of the solenoid 30 shifts the counter into low speed as hereinafter described in detail. During low speed operation, normal mutilated gear transfer occurs between all of the number wheels 5–9.

It is to be understood that the input pulley 13 can be driven from any source which normally is used to drive mechanical counters. It often is desirable to count the movements of a device or the number of operations which said device performs. In such cases, the movements of the device or the number of operations are used to drive the pulley 13. Also, it is often desirable in instruments of the servo type for measuring variables to have digital indications of the measurements. In such case, the instrument servo means is used to drive the pulley 13. Such variables might be weight, pressure, temperature, height, position, etc. It also is to be understood that the means for changing the counter from one speed to the other need not include a solenoid. Any suitable means, such as hand operation, can be used in place of the solenoid 30 for driving the speed changing mechanism hereinafter described.

The gear 19 is secured to a hub 33 consisting of first and second portions 34 and 35, respectively, press fitted together and mounted to be freely rotatable on the shaft 20. Also secured to the sub 33 is a pinion 36. Accordingly, the hub 33, the gear 19 and the pinion 36 turn together as one and are freely rotatable on the shaft 20. A clutch disc 37 is pinned at 38 to the shaft 20 adjacent the pinion 36 and carries a rubber O-ring 39 around but to one side of its periphery which provides a surface having a relatively high coefficient of friction. The clutch disc 37 carries a shaft 40 rotatably mounted in a bushing 41 and the shaft 40 carries in turn a gear 42 meshing with the pinion 36 at its one end and a planetary pinion 43 at its other end. The planetary pinion 43 meshes with an internal gear 44 fixed by means of screws 45 (FIGS. VIII and X) to a gear 46. The gear 46 is mounted on a hub 47 which is rotatable and axially slidable on the end of the shaft 20 and on an end of a shaft 48 rotatably mounted in bearings 49 in two of the plates 2 and in a bearing 50 in the left hand one of the end plates 3 as viewed in FIG. IX. The hub 47 serves as a support for such end of the shaft 20, there being a space 51 between the juxtaposed and axially aligned ends of the shafts 20 and 48 so that shafts do not turn together as one. A cam 52, having two low spots 53 (FIG. VII) directly opposite each other, also is mounted on the hub 47 and is also connected by means of the screws 45 to the gear 46, spacers 54 (FIGS. VIII and X) separating the cam 52 from the gear 46. Accordingly, the hub 47, the gears 44 and 46, and the cam 52 are rotatable and axially slidable on the juxtaposed ends of the shafts 20 and 48.

A cam follower 55, in the form of a flat-bottomed V-shaped pulley, is rotatably mounted on the end of an arm 56 pivotally mounted at 57 to the middle one of the plates 2. As shown in FIG. VII, the cam follower 55 is received in one of the two low spots 53 on the cam 52. A grooved guide 58 (FIG. I) carried by such middle one of the plates 2 limits side motion of the arm 56. The core 59 of the solenoid 30 is pivotally connected at 60 (FIG. VII) to the arm 56. As hereinbefore described, the solenoid 30 is energized to shift the counter into high speed and is deenergized to shift the counter into low speed. Energization of the solenoid 30 pivots the arm 56 about its pivot 57 in a clockwise direction as viewed in FIG. VII in opposition to a spring 61 extending between the base plate 1 and the arm 56. The arm 56 lifts the cam follower 55 carried thereby off the cam 52 into the position shown in FIG. X. A coil spring 62, around a slider 63 loose on the shaft 48 and between the middle one of the plates 2 and a flexure spring 64 engaging a shoulder 65 on the slider, then pushes the slider 63 and the hub 47 abutting the slider 63 and the gears 44 and 46 and the cam 52 carried by the hub 47 to the right as viewed in FIG. IX until the side of the gear 44 engages the rubber O-ring 39 on the clutch disc 37. This moves the flexure spring 64 into a position underneath the arm 56 as shown in FIG. X. The flexure spring 64 is connected to the middle one of the plates 2 by means of a screw 66 and has a bent-back free upper end 67 which is received in a cut-away portion 68 of such plate 2 when the cam follower 55 engages the cam 52 as shown in FIG. IX. Hence, energization of the solenoid 30 unlocks the cam 52 as shown in FIG. X to shift the counter into high speed. In high speed operation, engagement of the gear 44 with the rubber O-ring 39 on the clutch disc 37 causes the hub 47, the cam 52, the gears 44 and 46, and the clutch disc 37 to turn together as one.

Deenergization of the solenoid 30 permits the spring 61 to pivot the arm 56 about the axis of pivot 57 in a counterclockwise direction as viewed in FIG. VII until the cam follower 55 engages the cam 52. During this movement of the arm 56, the end of the arm 56 at the cam follower 55 engages the upper spring end 67 and bends the flexure spring 64 away from the cam 52 compressing the coil spring 62 between the plate 2 and the flexure spring 64. Engagement of the cam follower 55 with the cam 52 first engages one of the V-shaped sides of the cam follower 55 as indicated will happen in FIG. X and then pulls the cam 52 to the left as viewed in FIG. X until the cam 52 is positioned as shown in FIG. IX directly underneath the cam follower 55. Such movement of the cam 52 to the left is effected easily because just before such movement the flexure spring 64 was bent away from the cam 52 to compress the coil spring 62 as above described. Such movement of the cam 52 to the left uncouples the gear 44 from the O-ring 39 on the clutch disc 37, the cam 52, the hub 47 and the gears 44 and 46 moving together as one. Engagement of the cam follower 55 with the cam 52, if engagement is not by chance with one or the other of the low spots 53 on the cam 52, turns the cam 52, for a reason hereinafter described, until the cam follower 55 rests in one or the other of the low spots 53 on the cam 52 as shown in FIG. VII. Hence, deenergization of the solenoid 30 locks the cam 52 as shown in FIGS. I, VII and IX to shift the counter into low speed with the gear 44 disengaged from the O-ring 39 on the clutch disc 37. Engagement and disengagement of the gear 44 and the clutch disc 37 causes the gear 44 to slide to the right or to the left, respectively, as viewed in FIG. IX on the planetary pinion 43 but never causes disengagement of the gear 44 from the planetary pinion 43.

In low speed with the cam 52 locked and the gear 44 and the clutch disc 37 disengaged, ordinary intermittent motion transmitting means, hereinafter described, between the number wheels 5, 6, 7, 8 and 9 operate such that each of the number wheels, except the wheel of the lowest order, is stationary except when the indication of the next lower number wheel is changing from 9 to 0 or 0 to 9. At low speed, the internal gear 44 is locked in place by means of the locked cam 52 and the planetary pinion 43 meshed with the gear 44 travels around the gear 44, i.e., the planetary pinion 43 rotates about the axis of the shaft 20. The planetary pinion 43 also rotates at the same time about the axis of the shaft 40. This produces a 10:1 speed ratio between the gear 19 and the clutch disc 37 which carries the planetary pinion 43, i.e., the clutch disc 37 turns at one tenth the speed of the gear 19. The clutch disc 37 and the gear 19 turn in the same direction. Since the clutch disc 37 is pinned to the shaft 20 at 38 and since the clutch disc 37 is gear connected to the gear 19, the gear 19 drives the shaft 20, but only indirectly. Accordingly, the servo motor by turning the input pulley 13 drives the potentiometer shaft 27 which is operatively connected to the shaft 20 as described above and also drives the units number wheel 5 also as described above. If the above weighing scale has a capacity of 1000 pounds, for example, and a load weighing 1000 pounds is placed upon the scale, the servo motor drives the input pulley 13 until the potentiometer shaft 27 turns the sliding contact of the potentiometer 28 from its beginning to its end position, whereby the potentiometer 28 supplies a voltage which counterbalances the output voltage from the weighing scale transducer. At the same time, the number wheels turn until 1000 is indicated, the counter being calibrated to indicate such output voltage in terms of weight. Hence, at low speed, the counter may be pictured functioning as an ordinary intermittent motion mechanical counter having conventional carry transfer between number wheels, the input pulley 13 driving the units number wheel 5 directly, since it turns as one therewith, and also driving the potentiometer shaft 27 through the gearing above described.

Referring to FIG. III, the units number wheel 5 also includes a gear 69, a two-toothed gear segment 70, a locking disc 71, and a series of step cams 72, all integrally formed. The gear 69 has no function on the units wheel, but its counterparts on the rest of the number wheels do have a function as hereinafter described. All of the number wheels are made alike for the purpose of economy. The step cams 72 may be sensed to set up a printer or an electrical recorder according to the counter reading by conventional step-cam sensing mechanism and are not a part of the present invention. Such sensing mechanism usually has a detent finger which may cooperate with the star wheel 17 to center the units wheel 5 and thereby the rest of the number wheels to the nearest unit value before printing takes place.

Referring to FIGS. II, V and VI, the tens number wheel 6 includes a gear 73, a two-toothed gear segment 74, a locking disc 75, and a series of step cams 76, all integrally formed. In between the units wheel 5 and the tens wheel 6 there is a located a hub 77 mounted for rotation on the shaft 4 and a gear 78 on the hub 77. The gear 78 carries a bushing 79 through which extends a shift 80 carrying a gear 81 on its one end meshing with the gear 73 on the tens wheel 6 and a pinion 82 on its other end engageable periodically by the two-toothed gear segment 70 on the units wheel 5. The gear 78 is meshed with the gear 46 (FIG. I). At low speed, the gear 46 is locked in place by means of the locked cam 52 and accordingly, at low speed, the gear 78 is stationary and functions only as a support for journaling the gear 81 and the pinion 82.

Referring to FIG. IV, the hundreds wheel 7 is a duplicate of the units and tens wheels, except that the hundreds wheel 7 is provided with a switch operator 83 at its periphery. A gear 84 on the hundreds wheel 7 is like the gears 69 and 73 on the units and tens wheels, respectively. A bracket 85 (FIG. I) attached to the middle one of the plates 2 has a downwardly extending arm 86 (FIG. IV) carrying a block 87 journaling a pinion 88 and a gear 89. The pinion 88 is shown meshed with the two-toothed gear segment 74 on the tens wheel 6 in FIGS. V and VI and the gear 89 is indicated in FIG. IV to be meshed with the gear 84 on the hundreds wheel 7.

The thousands wheel 8 is a duplicate of the tens wheel 6 and is driven by gearing that is like the gearing which drives the tens wheel 6. Such gearing includes a gear 90 (FIG. I) and a pinion 91 which are the same in structure as the gear 78 and the pinion 82 and the tens wheel 6. The pinion 91 is engageable periodically with a two-toothed gear segment 92 on the hundreds wheel 7 and drives the thousands wheel 8 in the same manner as the pinion 82 drives the tens wheel 6.

The ten thousands wheel 9 also is a duplicate of the tens wheel 6 and is driven by gearing that is like the gearing which drives the tens wheel 6. Such gearing includes a gear 93 and a pinion 94 which are the same in structure as the gear 78 and the pinion 82 at the tens wheel 6. The pinion 94 is engageable periodically with a two-toothed gear segment 95 on the thousands wheel 8 and drives the ten thousands wheel 9 in the same manner as the pinion 82 drives the tens wheel 6.

The right hand end of the hub 10 is positioned against the right hand one of the plates 2 as shown in FIG. I and the various number wheels and gears are positioned along the stationary shaft 4 also as shown in FIG. I. A split sleeve 96 (FIG. I), within an opening in the left hand one of the plates 2, around the shaft 4 and against the ten thousands wheel 9, functions to adjust the end thrust of the several members one against the other.

Every other tooth on the transfer pinions 82, 88, 91 and 94 is mutilated by cutting one-half of it away as shown in FIG. II (pinion 82) and in FIG. IV (pinion 88). Taking pinion 88 as exemplary, the locking disc 75 (FIGS. V and VI) on the tens wheel 6 is received, whenever the two-toothed gear segment 74 is out of engagement with the pinion 88 in the spaces provided by the cut away parts of the mutilated teeth on the pinion 88. This holds the pinion 88 against undesired turning because the non-mutilated teeth engage the locking disc 75. Transfer pinions 82, 91 and 94 are locked periodically similarly. This is conventional transfer pinion locking found in many mechanical counters. The pinion 88 is engaged periodically by the two-toothed gear segment 74 on the tens wheel 6. This turns the pinion 88, since the locking disc 75 is cut away at the teeth on the gear segment 74. Transfer pinions 82, 91 and 94 are driven periodically similarly. This is conventional mutilated tooth intermittent motion transfer found in many mechanical counters. The pinion 88 by turning the gear 89 (FIG. IV) meshed with the gear 84 on the hundreds wheel 7 drives the hundreds wheel 7 whenever the indication of the tens wheel 6 is changing from 9 to 0 or 0 to 9. Accordingly, the transfer pinions 82, 88, 91 and 94 and their associated gearing coact to advance a particular number wheel of higher order by one number when the number wheel of the next lower order has completed one full revolution.

In low speed operation, the input pulley 13 drives the potentiometer shaft 27 and the units wheel 5 as described above. Every time that the units wheel 5 completes one revolution, the gear segment 70 on the units wheel engages the transfer pinion 82 advancing or retracting the tens wheel 6 by one number. The complete gear drive for this action is shown in FIG. VI. Every time that the tens wheel 6 completes one revolution, the gear segment 74 on the tens wheel 6 engages the transfer pinion 88 advancing or retracting the hundreds wheel 7 by one number. The transfer gearing between the tens wheel 6 and the hundreds wheel 7 is exactly like the transfer gearing between the units wheel 5 and the tens wheel 6 except, instead of having a gear like the gear 78 (stationary during low speed operation) journaling the transfer pinion and the gear connected thereto, the block 87 journals the transfer pinion 88 and the gear 89 connected thereto. Every time that the hundreds wheel 7 completes one revolution, the gear segment 92 on the hundreds wheel 7 engages the transfer pinion 91 advancing or retracting the thousands wheel 8 by one number. Every time that the thousands wheel 8 completes one revolution, the gear segment 95 on the thousands wheel 8 engages the transfer pinion 94 advancing or retracting the ten thousands wheel 9 by one number. The complete gear drive between the hundreds wheel 7 and the thousands wheel 8 and the complete gear drive between the thousands wheel 8 and the ten thousands wheel 9 are not shown because each of such drives is a duplicate structurally of the gear drive between the units wheel 5 and the tens wheel 6 shown in detail in FIG. VI.

In high speed operation, the cam 52 is unlocked and the gear 44 engages the clutch disc 37 causing the gear 46, attached to the gear 44, to turn as one with the clutch disc 37 as described above. The gears 19 and 46 and the clutch disc 37 then turn at the same speed. The drive from the gear 19 through the clutch disc 37 is through the pinion 36 which turns as one with the gear 19 to the gear 42 which cannot turn about the axis of the shaft 40 because the clutch disc 37 carrying the gear 42 is rotating at the same speed as the internal gear 44 meshed with the pinion 43 that turns as one with the gear 42. Hence, the gear 42 rotates only about one axis, i.e., the axis of the shaft 20. The clutch disc 37 drives the shaft 20 ten times faster than it does at low speed. That is, in high speed, the clutch disc 37 turns as one with the gear 19, while in low speed, the clutch disc 37 turns at one tenth the speed of the gear 19 as described above. Accordingly, the input to the potentiometer 28, operatively connected to the shaft 20, is ten times faster at high speed than it is at low speed. As hereinafter described, the speed of the counter operation also is increased by ten to maintain the counter synchronized with the potentiometer.

There is a 1:1 gear ratio between the gears 19 and 46 at high speed, the gear 46 being meshed with the gear 78 (FIGS. I and VI). Also, the gear ratio between the gears 46 and 78 is the same as the gear ratio between the gears 19 and 15. Hence, the gears 15 and 78 are turned at the same speed. Gear 15 drives the units wheel 5 as hereinbefore described. Gear 78 drives the tens wheel 6 as hereinafter described. The units and tens wheels are driven in the same direction at the same speed. As the gear 78 turns, it carries the transfer pinion 82 (FIG. VI) and the gear 81 about the axis of the stationary shaft 4. Since the two-toothed gear segment 70 also is rotating about the axis of the shaft 4 in the same direction and speed as the transfer pinion 82, no periodical engagement occurs between the gear segment 70 and the pinion 82. That is, normal intermittent motion transfer between the units and hundreds wheels does not occur. However, such normal transfer does occur between the rest of the number wheels. That is, the transfer between all of the number wheels is the same at high or low speed, except for the transfer between the units and tens wheels. Rotation of the gear 81 about the axis of the stationary shaft 4 causes the tens wheel 6 to rotate about the axis of the shaft 4, since the gear 73 on the tens wheel 6 is meshed with the gear 81 and since the gear 81 cannot turn about the axis of the shaft 80 because the pinion 82 is locked in place either by the locking disc 71 or by the gear segment 70 on the units wheel 5. Accordingly, the input to the potentiometer is ten times faster at high speed than it is at low speed and the counter operates ten times faster at high speed than it does at low speed, because at high speed the units and tens wheels turn together as one while at low speed the units wheel turns ten times for every one turn of the tens wheel.

At the beginning of a count with the counter set to operate at low speed, all of the number wheels register zero, all of the transfer pinions and two-toothed gear segments being so oriented that each of the number wheels, except the units wheel 5, is stationary except when the indication of the next lower number wheel is changing from 9 to 0 or 0 to 9. However, rotation of the gear 78 moves the transfer pinion 82 from its home position shown in FIG. VI during high speed operation to other positions around the axis of the shaft 4. Should the counter automatically be shifted into low speed operation when the transfer pinion 82 is in one of such other positions, transfer between the units and tens wheels will not occur when the indication of the units wheel is changing from 9 to 0 or 0 to 9. Accordingly, it is necessary when changing from high to low speed to return the transfer pinion 82 to its home position shown in FIG. VI. This is accomplished by the cam 52.

When changing from high speed to low speed, the cam 52 is locked by the cam follower 55 and the internal gear 44 is withdrawn from the clutch disc 37. Engagement of the cam follower 55 with the cam 52, if engagement is not by chance with one or the other of the low spots 53 on the cam, turns the cam until the cam follower rests in one or the other of the low spots 53 on the cam as shown in FIG. VII. Such turning of the cam 52 also turns the gear 46, attached to the cam, which in turn drives the gear 78 returning the transfer pinion 82 to its home position. The cam 52 has the two low spots 53 because of the 2:1 gear ratio between the gears 78 and 46, i.e., the gear 46 only has to be given one-half a revolution to turn the gear 78 one full revolution. Accordingly, engagement of the cam follower 55 in one or the other of the low spots 53 on the cam 52 locks the gear 78 in its stationary position shown in FIG. VI ready for low speed operation.

To summarize the operation, after loads are placed upon or removed from the scale, the counter is operated at high speed until arrival of condition at near balance. During this time, the units and tens wheels turn as one. Normal mutilated gear transfer occurs between the rest of the number wheels. Accordingly, during most of the cycle, the tens wheel turns ten times faster than is normal in an ordinary mechanical counter with no shock transfer between the number wheels of the two lowest orders where, in the prior mechanical counters, rapid acceleration and deceleration of the intermittently moved number wheels limited the speed at which the prior counters could be operated. At arrival of condition at near balance, the counter is shifted into low speed operation wherein normal mutilated gear transfer occurs between all of the number wheels.

Another feature of the counter resides in the provision of mechanism for adding second inputs to be counted into the counter during high or low speed operation or while the counter is at rest. Electrical or electronic weighing scale systems of the type disclosed in the above U.S. application Serial No. 806,394 often are provided with auxiliary load mechanism called "unit weight" mechanism for adding to the normal capacity of the scale. Such a weighing scale system provided with such unit weight mechanism is disclosed in the above U.S. Patent No. 2,944,808. When used in such a weighing scale system having unit weight mechanism the counter has a second input which adds the unit weight indication to the count, whereby the total weight of the load upon the scale is displayed in one set of figures. For example, if the normal capacity of the scale is 1000 pounds and nine 1000 pound unit weights are added in weighing a 10,000 pounds load, "10,000" will be displayed by the counter's number wheels. The mechanism for adding second inputs to be counted into the counter may be operated manually, but is shown automatically operated in FIG. I.

The gear 25 is shown in FIG. VII in its position at the start of a count. It rotates counterclockwise during counting. Should the gear 25 turn counterclockwise to a point beyond the range of the potentiometer 28, a pin or finger 97 carried by the gear 25 engages a stationary stop 98 attached as shown in FIG. VII to one of the plates 2. At the same time, a pin or switch operator 99 carried by the gear 25 closes a pair of normally open upper limit switches 100 and 101. Returning in the opposite direction, should the gear turn clockwise to a point below the range of the potentiometer 28, the finger 97 carried by the gear 25 engages the stationary stop 98. At the same time, the switch operator 99 carried by the gear 25 closes a pair of normally open lower limit switches 102 and 103. The switches 100–103 are carried by a plate 104 attached to the side of one of the plates 2. Normally, the gear 25 cycles back and forth between the upper and lower limit switches without causing their operation.

If the load upon the weighing scale is greater than its normal capacity, upper limit switches 100 and 101 are closed. Closing of upper limit switch 100 causes a motor 105 (FIG. I) to run in a direction to add unit weights and also energizes the coil of a solenoid 106 attached to a bracket 107 carried by the plate 32 (FIG. I). Energization of the solenoid 106 pivots an arm 108, pivoted at 109 to the left hand one of the plates 2 (FIG. I), in a clockwise direction as viewed in FIG. VIII in opposition to a spring 110 (FIG. I) extending between the base plate 1 and the arm 108, the core 111 of the solenoid 106 being pivotally attached to the arm 108. The arm 108 lifts a cam follower 112 carried thereby off a cam 113 unlocking the cam. The solenoid 106, arm 108, cam follower 112, cam 113 and their adjuncts are exactly like the solenoid 30, arm 56, cam follower 55, cam 52 and their adjuncts, respectively, hereinbefore described. Deenergization of the solenoid 106 permits the spring 110 to pivot the arm about the axis of the pivot 109 in a counterclockwise direction as viewed in FIG. VII until the cam follower 112 engages the cam 113, locking the cam.

The cam 113 is mounted on a hub 114 (FIG. IX) pinned at 115 to the shaft 48. Also mounted on the hub 114 is a gear 116, separated from the cam 113 by a spacer 117 and connected to the cam 113 by screws 118, and a pinion 119, the shaft 48, hub 114, cam 113, gear 116 and pinion 119 turning together as one. The gear 116 meshes with a gear 120 (FIG. I) on the shaft 121 of the motor 105 which is attached to one of the end plates 3. The pinion 119 meshes with a gear 122 mounted on a hub 123 pinned at 124 to a shaft 125 mounted for rotation in a bearing 126 in the end plate 3 and in a small plate 127 attached by means of screws to such end plate 3, spacers 128 and 129 on such screws positioning the small plate 127. Also mounted on the shaft 125 are movable selector switch contacts 130 and switch operating pins or fingers 131 and 132. Selector switch contacts 130 close contacts on stationary switch boards 133 to add fixed increments of voltage (electrical "unit weights") to the output voltage of the potentiometer 28 to increase the capacity of the weighing scale as shown and described in detail in the above U.S. Patent No. 2,944,808. Hence, the closing of upper limit switch 100 starts the motor 105, gear connected to the selector switch contacts 130, which drives the selector switch contacts 130 in a direction to increase the capacity of the weighing scale. If the load upon the scale is greater than the normal capacity of the scale plus the additional capacity provided by one electrical unit weight, the switch operator 99 on the gear 25 continues to close the upper limit switches 100 and 101, whereupon the motor 105 turns the selector switch contacts 130 additionally to add another electrical unit weight, etc.

A switch 134 is carried by the small plate 127 and a switch 135 is carried by the end plate 3. Normally, these switches are never operated. However, should the equipment be out of adjustment and the motor 105 tries to add or remove unit weights above or below, respectively, the possible range of the equipment, the switches 134 and 135 will be operated by fingers 131 and 132, respectively, to produce appropriate signals.

If the load upon the scale is less than the normal capacity of the scale plus the possible additional capacity provided by all of the electrical unit weights, i.e., the load is within the overall capacity of the system, the motor 105 adds electrical unit weights until the switch operator 99 on the gear 25 backs away from the upper limit switches 100 and 101, whereupon the upper limit switches open. Opening of the limit switch 100 stops the motor 105 and also deenergizes the solenoid 106. Deenergization of the solenoid 106 allows the return spring 110 to pivot the arm 108 counterclockwise as viewed in FIG. VII about the axis of the pivot 109 until the cam follower 112 engages the cam 113 positioning and locking the cam 113 and the parts driven thereby in the same manner as the cam follower 55 positions and locks the cam 52 and the parts driven thereby as above described.

When the load upon the scale is removed, the gear 25 turns until the pair of normally open lower limit switches 102 and 103 are closed. Closing of lower limit switch 102 causes the motor 105 to run in a direction to subtract the electrical unit weights and also energizes the coil of the solenoid 106. Energization of the solenoid 106 unlocks the cam 113. When the electrical unit weights are removed, the switch operator 99 on the gear 25 backs away from the lower limit switches 102 and 103, whereupon the lower limit switches open. Opening of the lower limit switch 102 stops the motor 105 and also deenergizes the solenoid 106 positioning and locking the cam 113. Accordingly, electrical unit weights are added and removed to vary the capacity of the weighing scale in a manner similar to the way in which such weights are added and removed in the weighing scale system disclosed in the above U.S. Patent No. 2,944,808.

Closing of the upper limit switch 101 causes a signal light to be lit. Closing of the lower limit switch 103, when a limit switch 136 (FIG. IV) carried by a bracket 137 hung from the center one of the plates 2 is closed by the switch operator 83 on the hundreds wheel 7, causes a signal light to be lit. The limit switch 136 is operated just behind zero indication on the hundreds wheel 7. When no load is upon the scale, the counter should indicate all zeros. However, through some slight maladjustment, the counter might indicate, when no load is upon the scale, "99,999." In such a situation, limit switch 136 is closed since it is operated just behind zero by the switch operator 83 on the hundred wheel 7 and lower limit switch 103 is closed by the pin 99 on the gear 25. Limit switches 136 and 103 are in series and their closing causes the signal light to be lit.

While the motor 105 is driving the selector switch contacts 130 to add or remove unit weights it also drives the shaft 48, which turns as one with the gear 116 meshed with the gear 120 on the motor shaft 121, to add the unit weight indication into or remove such indication from the counter. It is not necessary that the shaft 48 be motor driven or is it necessary that the shaft 48 be turned in conjunction with the addition or the removal of unit weights. For the purposes of the invention, the shaft 48 can be pictured as being turned manually to add a second input to be counted into the counter or to subtract such count from the indication.

Hubs 138 and 139 are pinned at 140 and 141, respectively, to the shaft 48. Gears 142 and 143 are pinned at 144 and 145, respectively, to the respective hubs. Gear 142 is meshed with gear 93 (FIG. I) and gear 143 is meshed with gear 90 (FIG. I). The gears 90 and 93 turn twice for each revolution of the gears 142 and 143. To add or remove a unit weight the gears 142 and 143 are turned in the proper direction one-half a revolution. This drives the gears 90 and 93 through one full revolution.

The second input can be added or subtracted from the counter at any time, i.e., while the counter is at rest or while the counter is in high or low speed operation. If the normal capacity of the scale is 1000 pounds, the highest indication registered on the number wheels is "01000." If the scale is provided with nine 1000 pound electrical unit weights, the highest indication registered on the number wheels is "10,000." In adding the first unit weight indication, the gears 142 and 143 are turned one-half a revolution in a direction to turn the gears 90 and 93 in a direction opposite to the direction of normal rotation of the number wheels, normal rotation being imparted by rotation of the input pulley 13. This turns the gears 90 and 93 one revolution or right back to where they started from. However, the gear 90 in so turning carries the transfer pinion 91 into engagement with the gear segment 92 on the hundreds wheel 7 causing the transfer pinion 91 to turn the thousands wheel 8 ahead one number. The counter then displays "02000." This continues as more unit weights are added until "09000" is indicated by the counter. On the addition of the ninth unit weight the same thing happens and in addition normal carry transfer from the thousands wheel 8 to the ten thousands wheel 9 drives the ten thousands wheel ahead one number. "10000" then is displayed by the counter. Normally, the gears 90 and 93 are locked through their operative connection to the locked cam 113 and accordingly, the gears 90 and 93 normally are stationary. The locked stationary gears 90 and 93 function as supports for journaling the transfer pinions 91 and 94.

Pins 146 and 147 are carried by the respective arms 56 and 108 (FIGS. I and VII). Pin 146 closes normally open switch 148 carried by the bracket 31 when the cam 52 is locked as shown in FIG. VII. Pin 147 closes normally open switch 149 carried by the bracket 107 when the cam 113 is locked. Switches 148 and 149 must be closed before the printer (not shown) hereinbefore referred to can be operated.

The principal feature of the mechanism for adding the second input into the counter resides in the possibility of addition or removal of such second input by simple means at any time while the counter is at rest or while the counter is in low or high speed operation. A related feature resides in the use of the same component parts between the units wheel 5 and the tens wheel 6 as are between the hundreds wheel 7 and the thousands wheel 8 and the thousands wheel 8 and the ten thousands wheel 9 even though such parts handle different inputs. The complete gear drive between the hundreds wheel 7 and the thousands wheel 8 and the complete gear drive between the thousands wheel 8 and the ten thousands wheel 9 are not shown because each of such drives is a duplicate structurally of the gear drive between the units wheel 5 and the tens wheel 6 shown in detail in FIG. VI. The gear drives between the hundreds wheel 7 and the thousands wheel 8 and between the thousands wheel 8 and the ten thousands wheel 9 handle, aside from the normal intermittent carry transfer (slow and fast speeds), the second input (unit weight). The gear drive between the units wheel 5 and the tens wheel 6 handles, aside from the normal intermittent carry transfer (slow speed), the first input (high speed). Hence, although the gear 46 and the gearing between the units wheel 5 and the tens wheel 6 driven thereby are like the gear 143 and the gearing between the hundreds wheel 7 and the thousands wheel 8 driven thereby and like the gear 142 and the gearing between the thousands wheel 8 and the ten thousands wheel 9 driven thereby, the gear 46 handles an input which is applied in a way which is different from the way in which the input is applied to the gears 142 and 143. The use of the same component parts helps keep the cost of the counter low.

It is to be understood that the above description is illustrative of this invention and that various modifications thereof can be utilized without departing from its spirit and scope.

Having described the invention, I claim:

1. A dual speed counter comprising, in combination, a plurality of rotatably mounted number wheels of ascending order, each of the wheels bearing numbers ascending through zero, input means for rotating the wheel of the lowest order, intermittent motion transmitting means between the wheels so functioning in low speed operation that each of the wheels of orders higher than the lowest is stationary except when the indication of the next lower wheel is changing at zero, and means effecting high speed operation by rotating a portion of the intermittent motion transmitting means between the wheels of the lower two orders at the same speed and in the same direction as the wheel of the lowest order thereby for rotating the wheel of the next to the lowest order at the same speed and in the same direction as the wheel of the lowest order.

2. A dual speed counter comprising, in combination, a plurality of rotatably mounted number wheels of ascending order, each of the wheels bearing numbers ascending to zero, input means for rotating the wheel of the lowest order, intermittent motion transmitting means between each pair of wheels for driving the wheel of the higher order in each pair of wheels from one number to the next whenever the other wheel in such pair changes its indication at zero, and means for rotating a portion of the intermittent motion transmitting means between the wheels of the lower two orders at the same speed and in the same direction as the wheel of the lowest order to thereby rotate the wheel of the next to the lowest order at the same speed and in the same direction as the wheel of the lowest order to increase the speed of operation.

3. A dual speed counter comprising, in combination, a plurality of rotatably mounted number wheels of ascending order, each of the wheels bearing numbers ascending to zero, input means for rotating the wheel of the lowest order, intermittent motion transmitting means between each pair of wheels for driving the wheel of the higher order in each pair of wheels from one number to the next whenever the other wheel in such pair changes its indication at zero, and gear means driven by the input means for rotating a portion of the intermittent motion transmitting means between the wheels of the lower two orders at the same speed and in the same direction as the wheel of the lowest order to thereby rotate the wheel of the next to the lowest order at the same speed and in the same direction as the wheel of the lowest order to increase the speed of operation.

4. A counter operable at low and high speeds comprising, in combination, a plurality of rotatably mounted number wheels of ascending order, each of the wheels bearing numbers ascending to zero, input means for rotating the wheel of the lowest order, intermittent motion transmitting means between each pair of wheels for driving the wheel of the higher order in each pair of wheels from one number to the next whenever the other wheel in such pair changes its indication at zero during low speed operation of the counter, and gear means driven by the input means for rotating a portion of the intermittent motion transmitting means between the wheels of the lower two orders at the same speed and in the same direction as the wheel of the lowest order to thereby rotate the wheel of the next to the lowest order at the same speed and in the same direction as the wheel of the lowest order during high speed operation of the counter, the gear means including a clutch disc and a gear shiftable into operative engagement with the clutch disc to effect the high speed operation and out of engagement with the clutch disc to effect the low speed operation.

5. A counter operable at low and high speeds comprising, in combination, a plurality of rotatably mounted number wheels of ascending order, each of the wheels bearing numbers ascending to zero, input means for rotating the wheel of the lowest order, intermittent motion transmitting means between each pair of wheels for driving the wheel of the higher order in each pair of wheels from one number to the next whenever the other wheel in such pair changes its indication at zero during low speed operation of the counter, gear means driven by the input means and including a first gear having a home position for rotating a portion of the intermittent motion transmitting means between the wheels of the lower two orders at the same speed and in the same direction as the wheel of the lowest order to thereby rotate the wheel of the next to the lowest order at the same speed and in the same direction as the wheel of the lowest order during high speed operation of the counter, the gear means further including a clutch disc and a second gear shiftable into operative engagement with the clutch disc to effect the high speed operation by driving the first gear, and out of engagement with the clutch disc to effect the low speed operation by locking the first gear, and means for shifting the second gear into and out of said operative engagement with the clutch disc including a cam operatively connected to the second gear for returning the first gear to its home position and locking it therein when changing from high to low speed operation.

6. A counter operable at low and high speeds comprising, in combination, an adjustable voltage source, a plurality of rotatably mounted number wheels of ascending order for reading out the voltage source, each of the wheels bearing numbers ascending to zero, input means for rotating the wheel of the lowest order, intermittent motion transmitting means between each pair of wheels for driving the wheel of the higher order in each pair of wheels from one number to the next whenever the other wheel in such pair changes its indication at zero during low speed operation of the counter, and gear means driven by the input means for driving the adjustable voltage source during low and high speed operation of the counter and for rotating a portion of the intermittent motion transmitting means between the wheels of the lower two orders at the same speed and in the same direction as the wheel of the lowest order to thereby rotate the wheel of the next to the lowest order at the same speed and in the same direction as the wheel of the lowest order during high speed operation of the counter, the gear means including clutch means operatively connected to the adjustable voltage source for driving the voltage source at a speed in accordance with the operating speed of the counter and a gear shiftable into operative engagement with the clutch means to effect the high speed operation of the counter and out of engagement with the clutch means to effect the low speed operation of the counter.

7. A dual speed counter comprising, in combination, a plurality of rotatably mounted number wheels of ascending order, input means for rotating the wheel of the lowest order, means for effecting carry transfer between the wheels, and selectively operable means for rotating a portion of the means for effecting carry transfer between the wheels of the lower two orders at the same speed and in the same direction as the wheel of the lowest order to thereby rotate the wheel of the next to the lowest order at the same speed and in the same direction as the wheel of the lowest order to increase the speed of operation.

8. A dual speed counter comprising, in combination, a plurality of rotatably mounted number wheels of ascending order, input means for rotating the wheel of the lowest order, means for effecting carry transfer between the wheels, and selectively operable gear means driven by the input means for rotating a portion of the means for effecting carry transfer between the wheels of the lower two orders at the same speed and in the same direction as the wheel of the lowest order to thereby rotate the wheel of the next to the lowest order at the same speed and in the same direction as the wheel of the lowest order to increase the speed of operation.

9. A dual speed counter comprising, in combination, an adjustable voltage source, a plurality of rotatably mounted number wheels of ascending order for reading out the voltage source, input means for rotating the wheel of the lowest order, means for effecting carry transfer between the wheels, gear means driven by the input means for driving the voltage source and being selectively operable for rotating a portion of the means for effecting carry transfer between the wheels of the lower two orders at the same speed and in the same direction as the wheel of the lowest order to thereby rotate the wheel of the next to the lowest order at the same speed and in the same direction as the wheel of the lowest order to increase the speed of operation of the counter, the gear means driving the voltage source at a speed in accordance with the speed of operation of the counter.

10. A counter operable at low and high speeds comprising, in combination, a plurality of rotatably mounted number wheels of ascending order, input means for rotating the wheel of the lowest order, means for effecting carry transfer between the wheels, selectively operable gear means including a gear having a home position for rotating a portion of the means for effecting carry transfer between the wheels of the lower two orders at the same speed and in the same direction as the wheel of the lowest order to thereby rotate the wheel of the next to the lowest order at the same speed and in the same direction as the wheel of the lowest order to change the speed of the counter from low to high speed, and cam means operatively connected to the gear means for returning gear to its home position and locking the gear it its home position when changing from high to low speed.

11. A dual speed counter comprising, in combination, a plurality of rotatably mounted number wheels of ascending order, input means for rotating the wheel of the lowest order, transfer means for effecting carry transfer between the wheels, said transfer means between the wheels of the two lowest orders including a rotatably mounted first gear, a second gear, a transfer pinion, the second gear and the transfer pinion both turning as one and being journaled in the first gear, and a third gear on the wheel of the next to the lowest order meshed with the second gear, the wheel of the lowest order periodically driving the transfer pinion to effect carry transfer during operation at low speed, selectively operable gear means for driving the first gear and thus the wheel of the next to the lowest order at the same speed and in the same direction as the wheel of the lowest order, whereby said carry transfer is not effected between the wheels of the two lowest orders to change selectively the speed of the counter from low to high speed, and cam means operatively connected to the gear means for returning the first gear to its home position and locking the gear in its home position when changing from high to low speed.

12. A dual speed counter comprising, in combination, a shaft, a plurality of number wheels mounted for rotation on the shaft, and transfer means for effecting carry transfer between the wheels, said transfer means between the wheels of the two lowest orders including a first gear mounted for rotation on the shaft, a second gear, a transfer pinion, the second gear and the transfer pinion both being journaled in the first gear and turning as one, and a third gear carried by the wheel of the next to the lowest order meshed with the second gear, the wheel of the lowest order so periodically driving the transfer pinion that the wheel of the next to the lowest order is stationary except when the indication of the wheel of the lowest order is changing at zero to effect carry transfer during low speed operation, the first gear functioning during low speed operation as a support for journaling the second gear and the transfer pinion and functioning additionally during high speed operation to drive the wheel of the next to the lowest order in the same direction and at the same speed as the wheel of the lowest order.

13. A dual speed counter comprising, in combination, a plurality of rotatably mounted number wheels, input means for rotating a first one of the wheels, means providing low speed operation for driving a second one of the wheels at a first speed relative to the speed of the first wheel, means providing high speed operation for driving the means providing low speed operation at the same speed as that of the first wheel to thereby drive the second wheel at said same speed, and means for effecting carry transfer between the rest of the wheels during low and high speed operations.

14. A dual speed counter comprising, in combination, a plurality of rotatably mounted number wheels, input means for rotating a first one of the wheels, drive means for driving the rest of the wheels at first speeds relative to the speed of the first wheel providing low speed operation, and means for driving a portion of the drive means at the same speed as that of the first wheel to thereby drive the rest of the wheels at second speeds relative to the speed of the first wheel providing high speed operation.

15. A dual speed counter comprising, in combination, a plurality of rotatably mounted number wheels, input means for rotating a first one of the wheels, first means for driving a second one of the wheels at a first speed relative to the speed of the first wheel, second means for driving the first means at the same speed as that of the first wheel to thereby drive the second wheel at said same speed, means controlling the operation of the second means for stopping and starting the second means and thus for varying the operating speed of the counter, and means for effecting carry transfer between the rest of the wheels.

16. A dual counter comprising, in combination, a plurality of rotatably mounted number wheels, input means for rotating a first one of the wheels, first means driven by the first wheel for driving a second one of the wheels at a first speed relative to the speed of the first wheel, second means driven by the input means for driving the first means at a second speed relative to the speed of the first wheel whereby the first and second wheels rotate at the same speed, selectively operable means controlling the operation of the second means for stopping and starting the second means and thus for varying the operating speed of the counter, and means for effecting carry transfer between the rest of the wheels.

17. A device of the class described comprising, in combination, adjustable electrical means, a plurality of rotatably mounted number wheels for reading out the electrical means, input means for rotating a first one of the wheels and for adjusting the electrical means, transfer means driven by the first wheel for driving a second one of the wheels at a first speed relative to the speed of the first wheel, means driven by the input means for driving a portion of the transfer means at a second speed relative to the speed of the first wheel to thereby drive the second wheel at the second speed, the input means adjusting the electrical means at a speed in accordance with the speed of the second wheel, and means for effecting carry transfer between the rest of the wheels.

18. A dual speed counter comprising, in combination, adjustable electrical means, a plurality of rotatably mounted number wheels for reading out the electrical means, input means for rotating a first one of the wheels, means for driving the rest of the wheels at first speeds relative to the speed of the first wheel providing low speed operation, means for driving the rest of the wheels at second speeds relative to the speed of the first wheel providing high speed operation, and means for adjusting the electrical means at a speed in accordance with the speed of said rest of the wheels.

19. A counter comprising, in combination, a plurality of rotatably mounted number wheels, input means for rotating a first one of the wheels, means for effecting carry transfer between the rest of the wheels, said means for effecting carry transfer between second and third ones of the wheels including a rotatably mounted first gear, a second gear, a mutilated pinion, the second gear and the pinion both being journaled in the first gear and turning as one, and a third gear on the third wheel meshed with the second gear, the second wheel periodically driving the pinion to effect carry transfer, and means for driving the first gear to add or remove a second input.

References Cited in the file of this patent
UNITED STATES PATENTS

| | | |
|---|---|---|
| 2,271,240 | Avery | Jan. 27, 1942 |
| 2,745,601 | Fowler et al. | May 15, 1956 |